Jan. 14, 1936.  M. KNOBEL ET AL  2,027,595
METHOD AND MACHINE FOR TESTING BLADES
Filed March 19, 1931   11 Sheets-Sheet 1
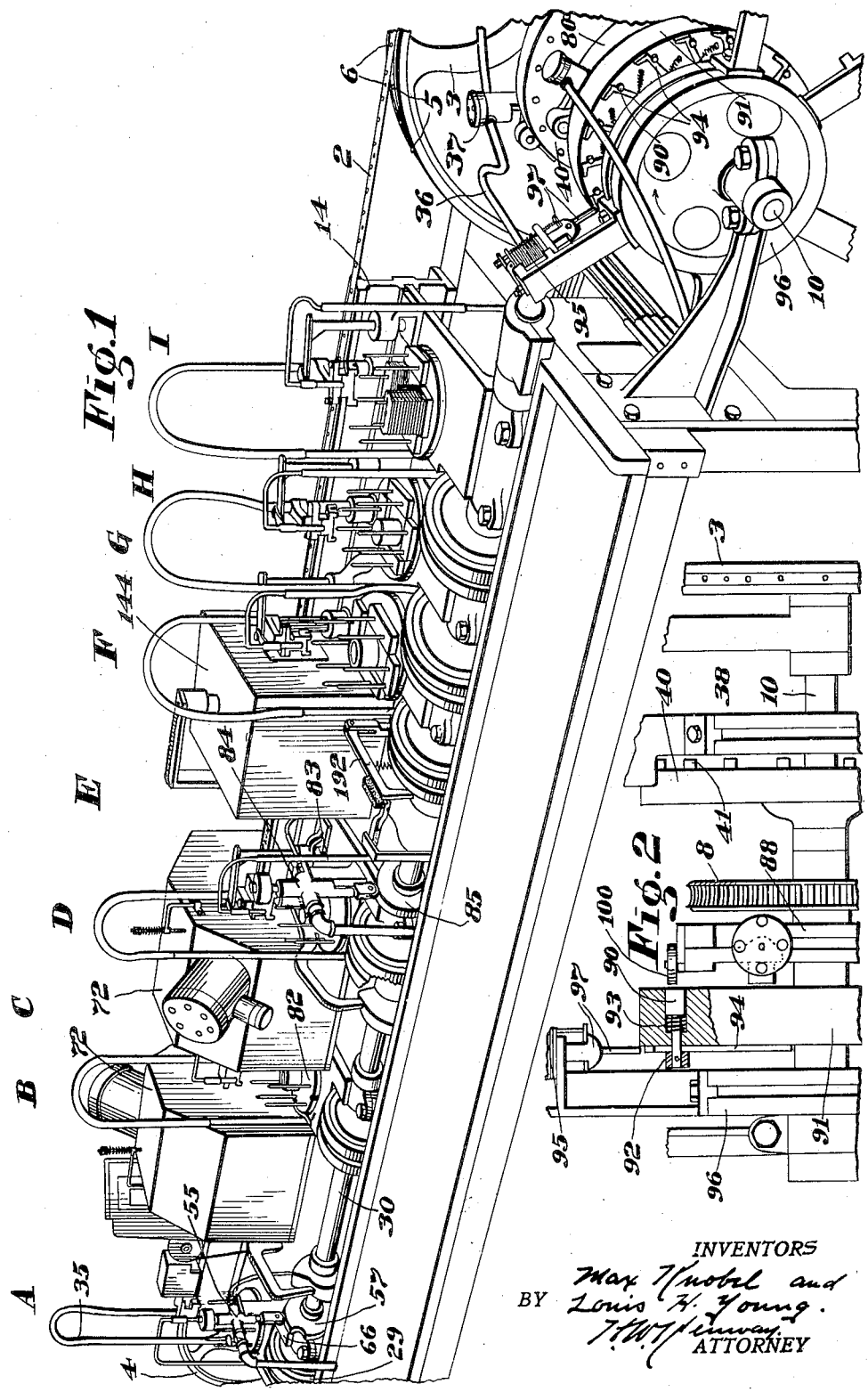
INVENTORS
Max Knobel and
Louis H. Young.
BY
ATTORNEY

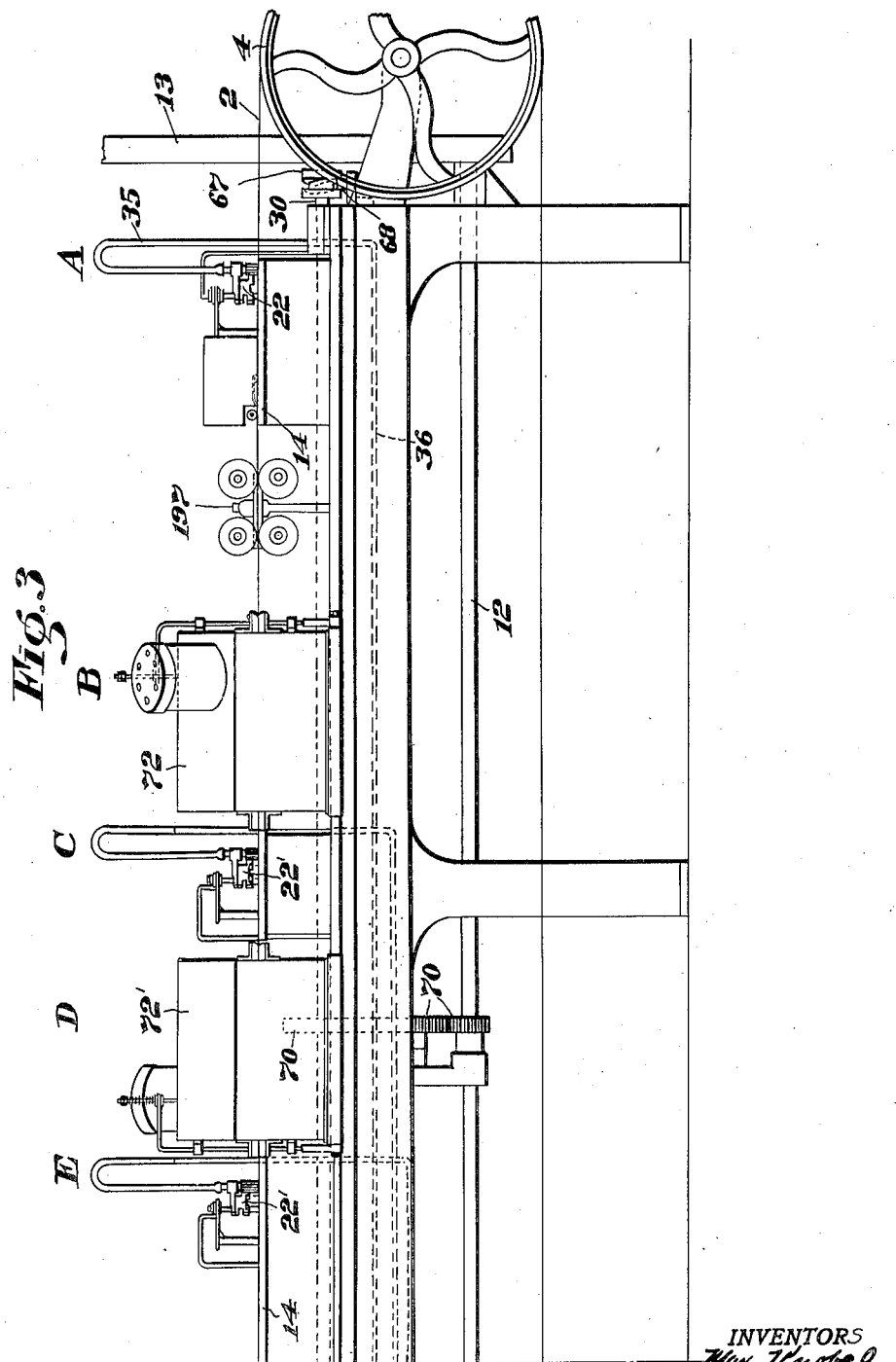

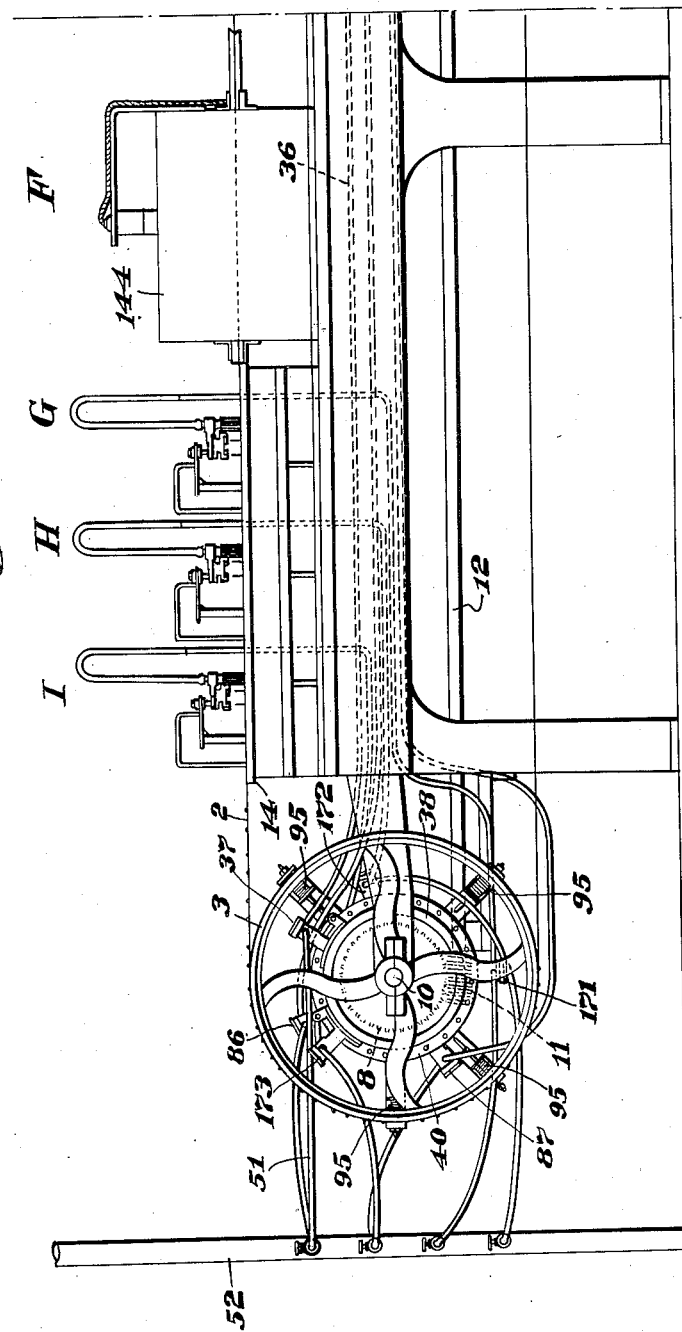

Jan. 14, 1936.　　　M. KNOBEL ET AL　　　2,027,595
METHOD AND MACHINE FOR TESTING BLADES
Filed March 19, 1931　　11 Sheets-Sheet 4
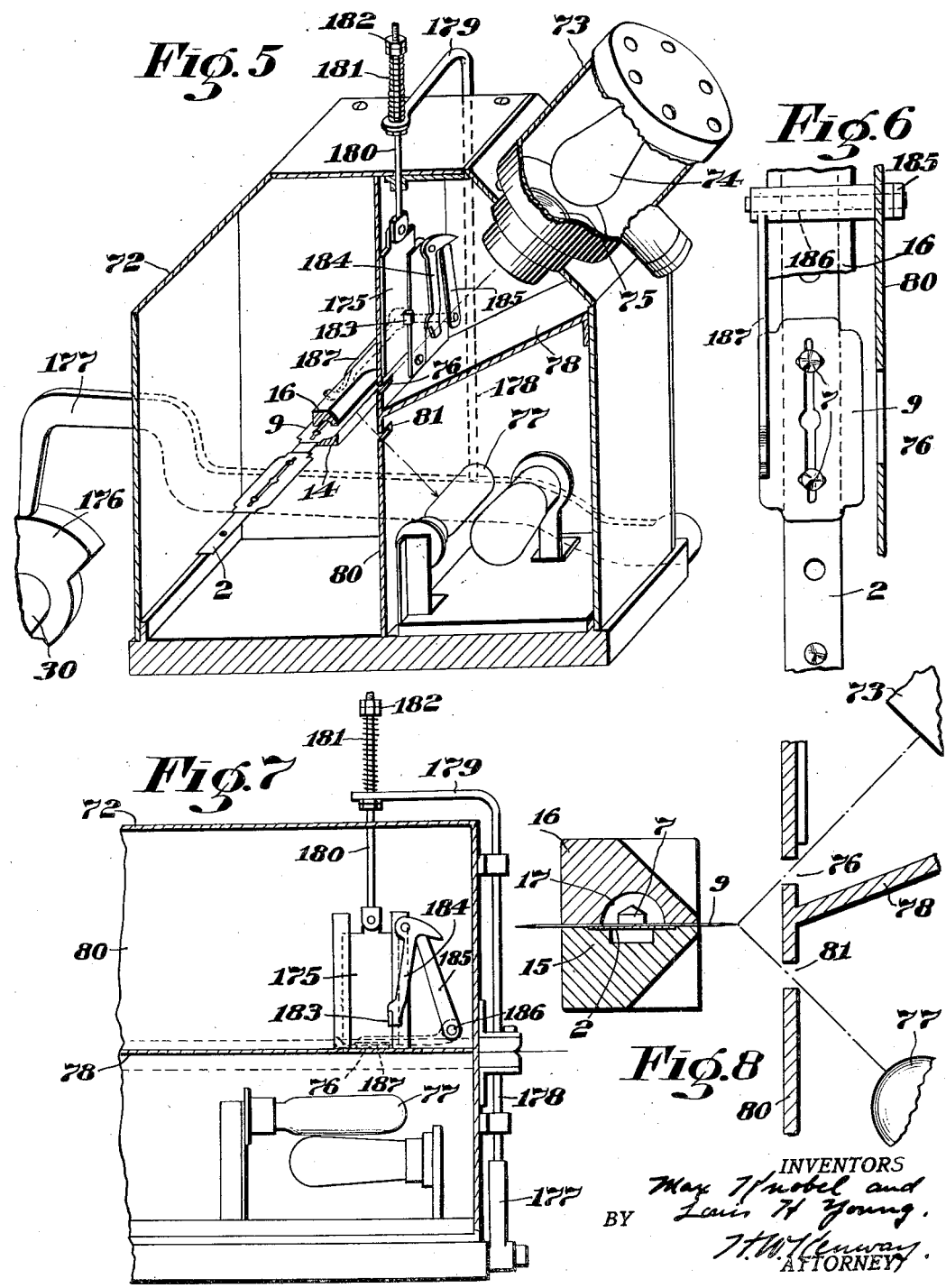

Jan. 14, 1936.  M. KNOBEL ET AL  2,027,595
METHOD AND MACHINE FOR TESTING BLADES
Filed March 19, 1931  11 Sheets-Sheet 5
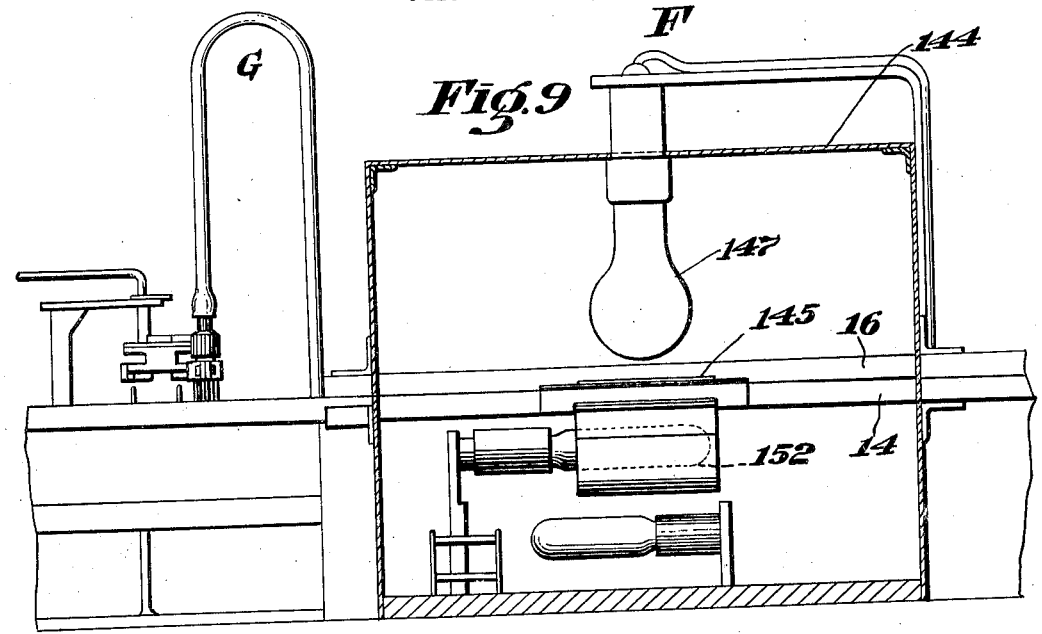
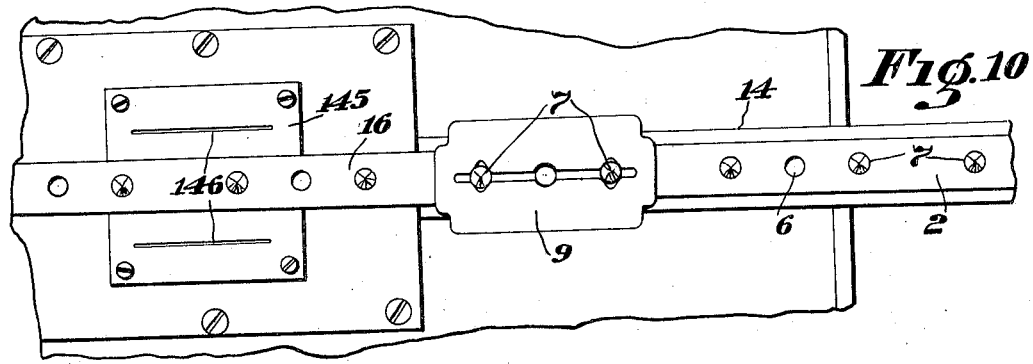
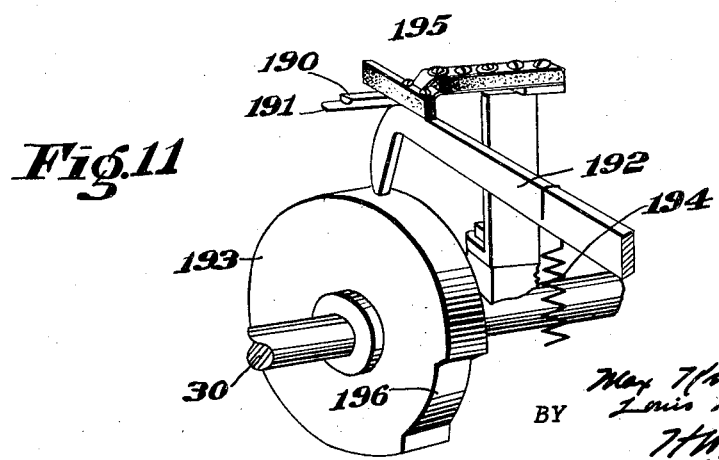

Jan. 14, 1936.  M. KNOBEL ET AL  2,027,595
METHOD AND MACHINE FOR TESTING BLADES
Filed March 19, 1931  11 Sheets-Sheet 7

INVENTORS
Max Knobel and
Louis H. Young.
BY
ATTORNEY

Jan. 14, 1936.    M. KNOBEL ET AL    2,027,595
METHOD AND MACHINE FOR TESTING BLADES
Filed March 19, 1931    11 Sheets-Sheet 8
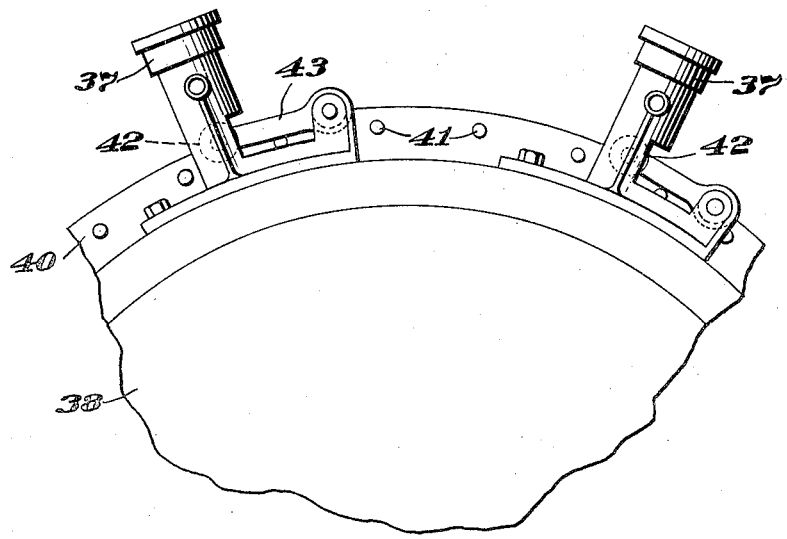
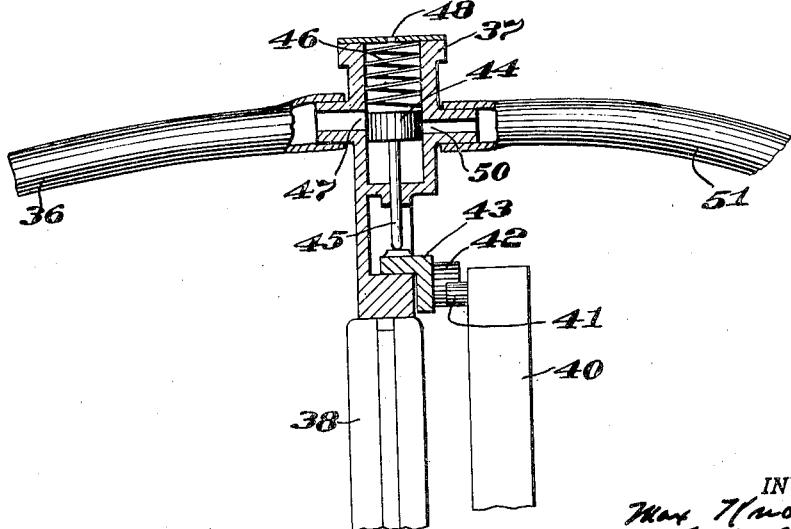
INVENTORS
Max Knobel and
Lewis W. Young.
BY
ATTORNEY Jan. 14, 1936.    M. KNOBEL ET AL    2,027,595
METHOD AND MACHINE FOR TESTING BLADES
Filed March 19, 1931    11 Sheets-Sheet 10
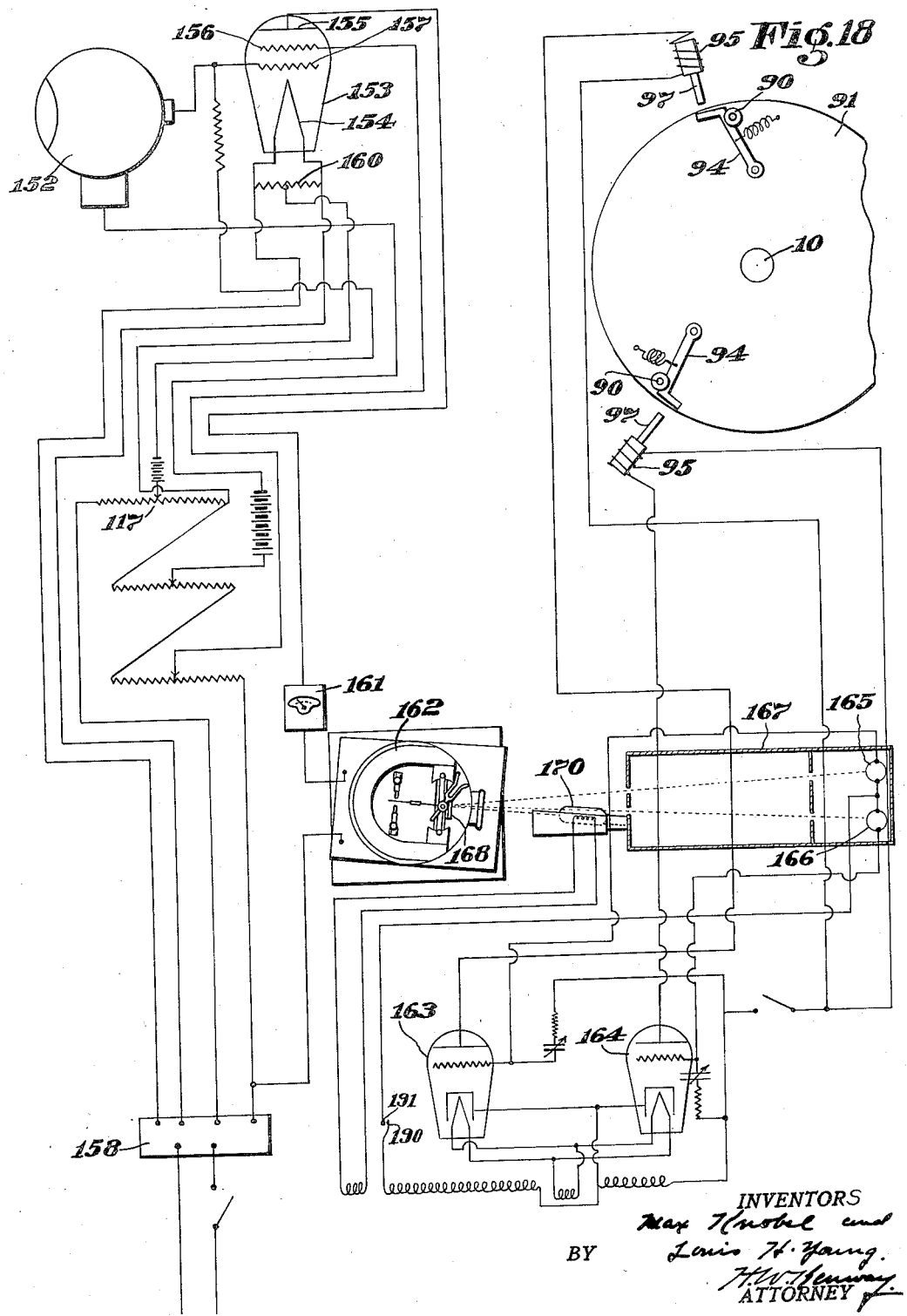

Jan. 14, 1936. M. KNOBEL ET AL 2,027,595
METHOD AND MACHINE FOR TESTING BLADES
Filed March 19, 1931 11 Sheets-Sheet 11
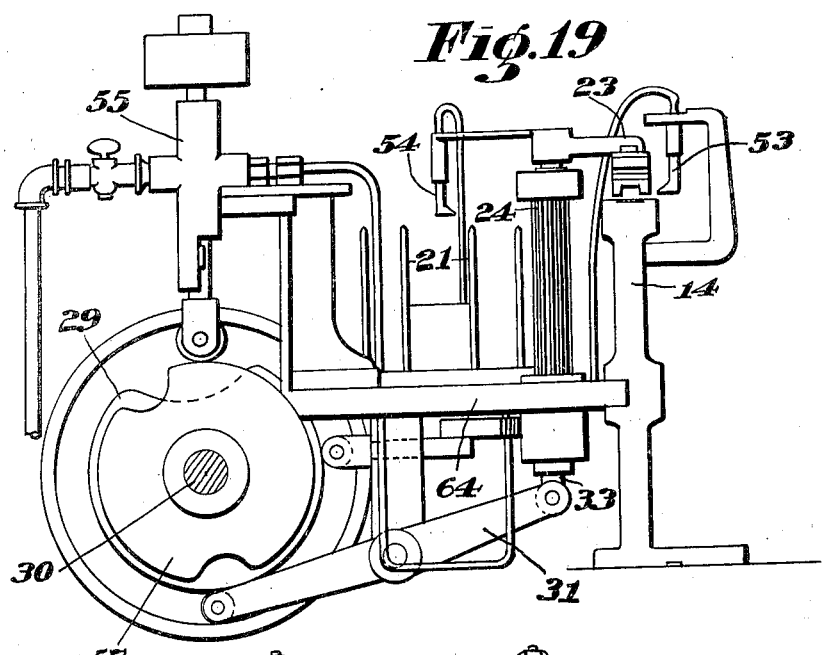
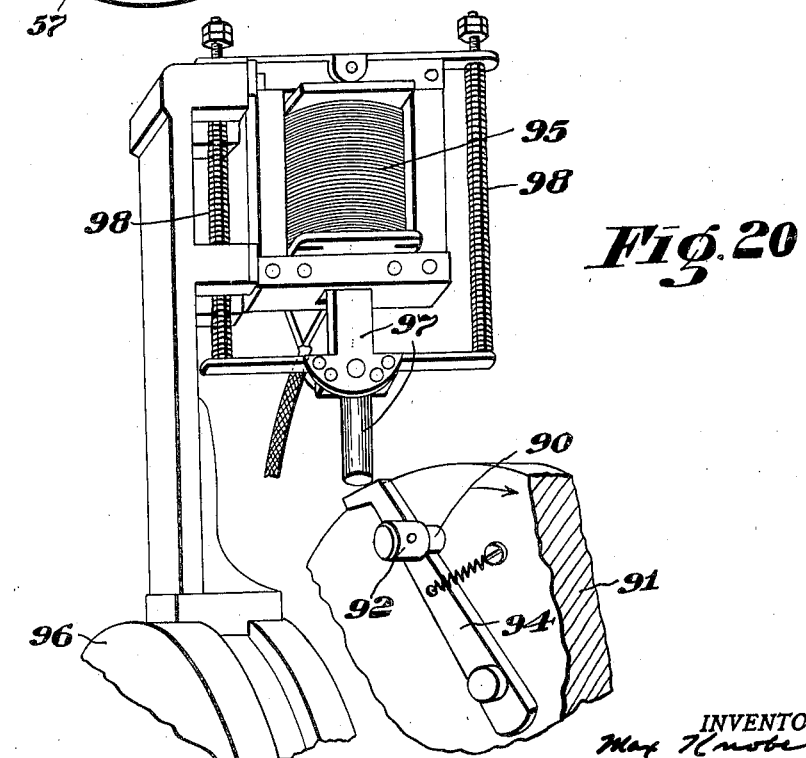

Patented Jan. 14, 1936

2,027,595

UNITED STATES PATENT OFFICE 2,027,595

METHOD AND MACHINE FOR TESTING BLADES

Max Knobel, Arlington, and Louis H. Young, Auburndale, Mass., assignors to Gillette Safety Razor Company, Boston, Mass., a corporation of Delaware Application March 19, 1931, Serial No. 523,812

43 Claims. (Cl. 209—111)

This invention relates to the inspection or testing of blades. The invention will be herein disclosed as embodied in a machine for testing safety razor blades of the well known double edged type, but it will be evident that many features of the invention are equally applicable to machines or apparatus for testing other kinds of blades.

When the manufacturing operations on safety razor blades have been completed, the blades then are subjected to a series of inspections or tests designed to detect faults or imperfections. Of these tests, those which have to do with the condition of the blade edge or edges not only are especially important, but are the most difficult to make satisfactorily in routine production. The nature of a razor blade edge is such that inspection for defects in its sharpness presents unusual difficulties. The old method of testing a blade edge by cutting a hair with it is still, so far as we are aware, the most satisfactory, and it is the method most commonly used. Due to the fact, however, that this inspection or test must be performed by hand, it is necessarily relatively slow and is correspondingly expensive. Such a test also is accompanied by some danger to the inspectors due to the nature of the articles handled. Furthermore, the human factor introduces variations in results which are unavoidable, as a practical matter, so that blades which have passed inspection are not always up to the desired standard.

The present invention deals especially with this problem. It aims to improve both the methods of, and the mechanism for, testing the sharpness of blade edges with a view to reducing the expense involved in this operation, and more especially, to producing more uniform results and making a more nearly perfect inspection.

Any substantial variation in the width of a safety razor blade, especially one of the double edged type, is objectionable because of its effect on the exposure of the edge with reference to the cap and guard of the blade holder. This exposure, or degree of projection of the blade edge beyond the cap, has a very important effect on the shaving qualities of the razor. The usual method of measuring the width of small articles such as blades is to caliper them but it obviously is impossible to caliper a sharpened safety razor blade without great danger of ruining the cutting edge. At the present time no entirely satisfactory method of inspecting the width of safety razor blades is available, so far as we are aware, which is suitable for use in factory production. It has, therefore, been the usual practice so to control the manufacturing operations as to minimize variations in width, so far as possible, and only very obvious variations in width have received attention in the final inspection.

It is a further object of this invention to devise a thoroughly practical mechanism for performing this testing or inspecting operation which will not only be extremely accurate, but which will perform this operation rapidly, and which will largely eliminate hand labor. The invention also involves a novel method of inspecting safety razor blades for width. It may here be noted, however, that the width inspection involves examination of the edges of the blade, and it is contemplated that this inspection or testing operation will have many features in common with that of testing the sharpness of the edges.

The nature of the invention will be readily understood from the following description when read in connection with the accompanying drawings, and the novel features will be particularly pointed out in the appended claims.

In the drawings,

Figure 1 is a perspective view of a machine constructed in accordance with this invention;

Fig. 2 is a partial elevation indicating somewhat diagrammatically the arrangement of various units on the shaft at the right-hand end of the machine as shown in Fig. 1;

Figs. 3 and 4 are front elevations of sections of the machine shown in Fig. 1;

Fig. 5 is a sectional perspective view of one of the units for testing the sharpness of the edges of the blades;

Fig. 6 is a plan view of a portion of the apparatus shown in Fig. 5;

Figs. 7 and 8 are sectional views illustrating details of construction of the apparatus shown in Fig. 5;

Fig. 9 is a vertical longitudinal sectional view illustrating features of the mechanism for testing the width of the blades;

Fig. 10 is a plan view illustrating details of the construction of said mechanism;

Fig. 11 is a perspective view of the automatic switch for controlling the lamp used in the width testing apparatus;

Figs. 15 and 16 are side and sectional view, respectively, of valves for controlling the admission of vacuum to the blade handling mechanisms;

Figs. 17 and 18 are diagrams of the electrical connections used in the machine;

Fig. 19 is a side view illustrating certain features of the blade handling mechanism; and Fig. 20 is a perspective view of parts of the connection for enabling the testing devices to control the blade sorting operation.

General statement

Figure 12:
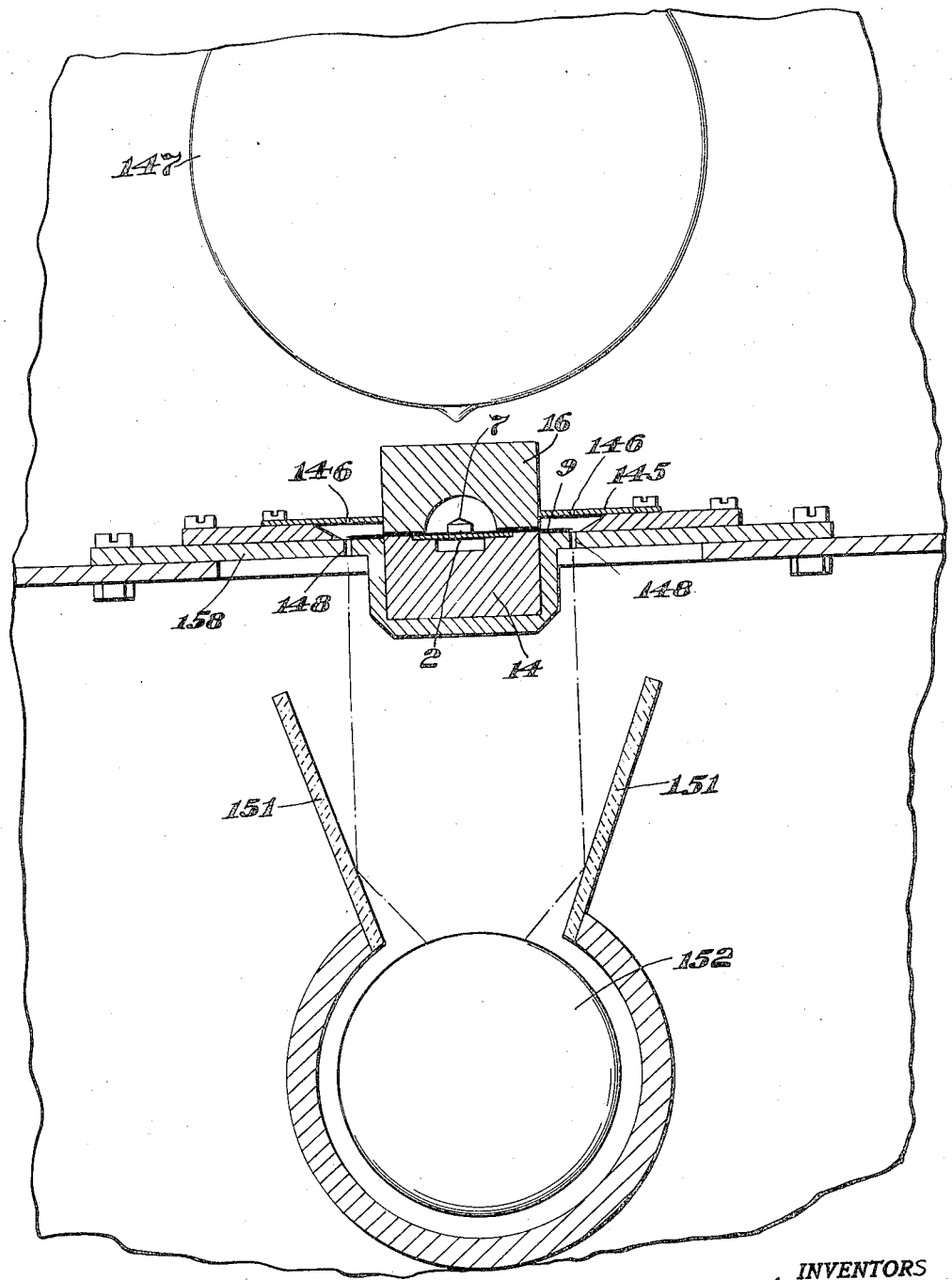
Fig. 12 is a vertical, transverse, sectional view on a large scale showing features of the width testing apparatus.

As above indicated, the machine shown in the drawings is designed especially to handle double edged safety razor blades and to perform the operations of testing the sharpness of both edges of each blade and the width of the blades, and subsequently sorting the blades to separate those blades which successfully pass the tests from those which are rejected. Briefly stated, the machine shown comprises a conveyor for carrying the blades to and from the testing devices, mechanism for placing the blades one at a time on the conveyor, devices for testing the sharpness of both edges, two separate devices for this purpose being provided in the present machine, a device for testing the width of the blades, mechanisms for removing the rejected blades from the conveyor, connections for causing the respective testing devices to control the operation of the blade removing mechanisms, and means for removing from the conveyor the blades which successfully pass the tests. The detailed description of the various features of the machine will be taken up in substantially the order in which they have just been mentioned.

Conveyor

Referring first to Figs. 1, 3 and 4, the blade conveyor consists of a metal belt 2 supported on two pulleys 3 and 4, respectively, the pulley 3 having a series of short pins 5, Fig. 1, projecting from its periphery to enter holes 6 in the belt in order to drive the belt positively. The belt carries a series of pins 7, best shown in Fig. 10, arranged in pairs, the individual pins of each pair being properly spaced to fit in an internal aperture in the blades 9 so that the blades, in addition to being transferred or conveyed by the belt are definitely and positively positioned on the belt by internal contact which leaves the sharpened edges freely exposed for the testing operations to be performed thereon.

The driving mechanism for the conveyor comprises a worm wheel 8 fast on the shaft 10 on which the pulley 3 is secured and a worm 11 for driving the wheel 8, this worm being secured on the end of a shaft 12 which extends substantially the entire length of the machine. At the end of the machine opposite to the worm 11 the shaft 12 is equipped with a pulley to receive a driving belt 13, Fig. 3. This mechanism is designed to drive the conveyor belt at a slow and substantially uniform speed.

All of the testing operations are performed on the blades while they are carried along on the upper reach of the conveyor belt, and in order to guide them in the desired path and to prevent the sagging of the belt, a guide or rail 14 is provided for it, the belt running in a groove 15, Fig. 8, formed in the upper surface of this rail. At several points along the rail a guard is placed over the belt, as shown at 16 in Figs. 5 and 8, the guard having a groove 17, Fig. 8, in its lower surface to permit the passage of the pins 7 and being spaced from the rail 14 by a distance slightly greater than the width of the belt.

Blade feeding and positioning mechanism

Figure 13:
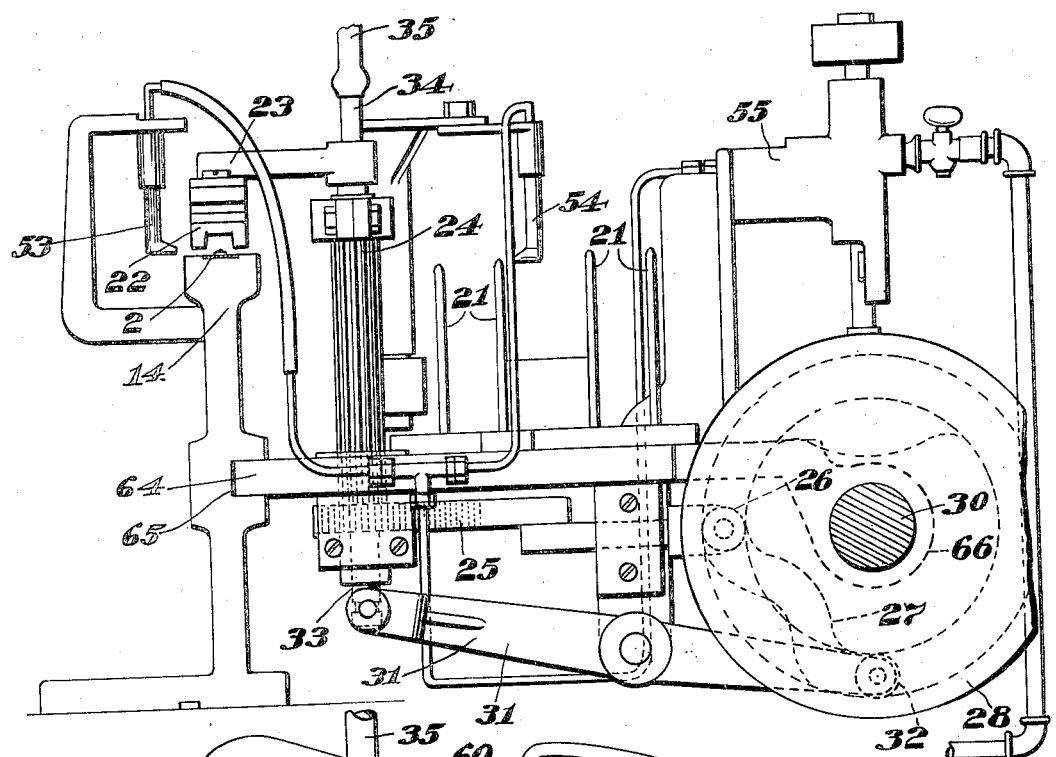
Figs. 13 and 14 are side and perspective views, respectively, of the automatic mechanism for placing the blades on the conveyor belt.
Figure 14:
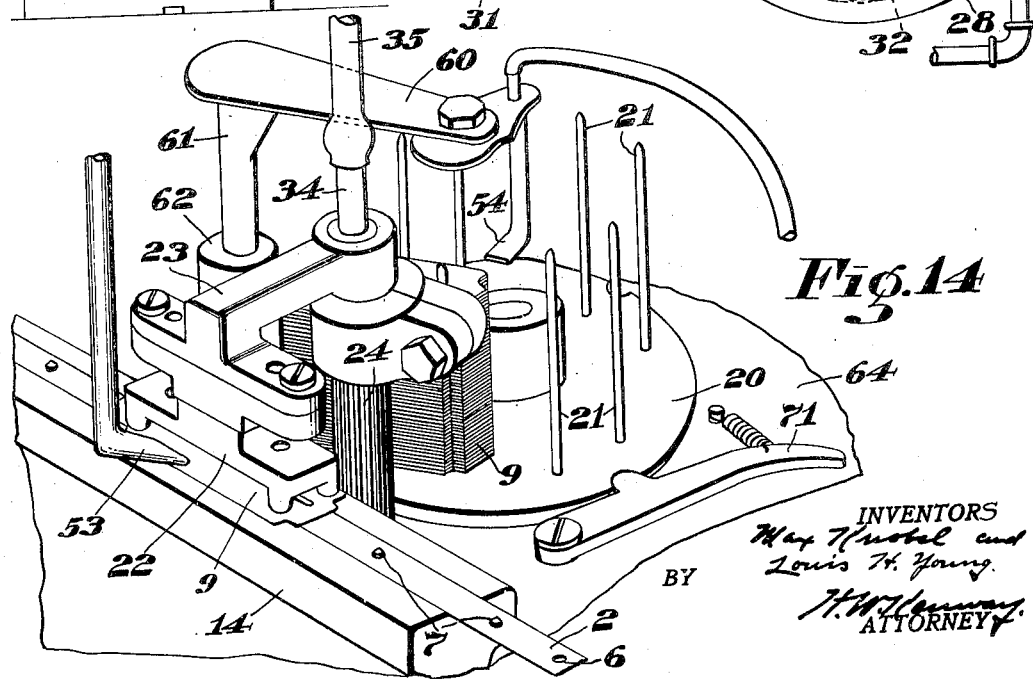

At the station A, Figs. 1 and 3, a mechanism is provided for placing blades to be tested one at a time on the conveyor belt. This mechanism is best shown in Figs. 13, 14 and 19 and is constructed and arranged to operate in a similar manner to the blade handling mechanism shown in Patent No. 1,255,917, granted February 12, 1918. It comprises a magazine plate 20 having a series of pins 21 arranged in pairs, each pair being adapted to support a stack of blades 9. A suction pickup mechanism is provided to take blades one at a time from the top of the stack and transfer them to the belt 2. This pickup mechanism is of a known form and comprises a suction head 22 shaped for contact with the blades and mounted on an arm 23 which is supported on the upper end of an upright barrel pinion 24. A rack 25 meshes with this pinion and is connected with a roll 26, Fig. 13, running in a path 27 of a cam 28 fast on a horizontal shaft 30, this cam path being designed to move the pinion far enough to swing the suction head 22 from a position in line with the pair of pins 21 which holds the blades 9, into another position in line with, and directly over, the conveyor belt 2. The suction head is also given an up and down movement through connections with a second cam 29 fast on the shaft 30 and located immediately beside the cam 28, these connections including a lever 31, Fig. 13, carrying at one end a roll 32 which runs in the cam path. At its opposite end this lever is pivoted to a rod or pin 33 which extends into the lower part of the pinion 24 without interfering with the rotary movement of the pinion.

The suction head 22 and arm 23 are made hollow and communicate with a nipple 34 to which a flexible tube 35 is connected, the latter tube running to a pipe 36, Figs. 3 and 4, which leads from a valve 37, Figs. 1 and 4, that controls the admission of suction to the pipe 36. Referring to Figs. 1, 2, 4, 15 and 16, it will be seen that the valve 37, together with certain other valves of a similar construction, are supported on a disk 38 which is mounted on the shaft 10, the disk, however, being held against rotation. Immediately beside the disk 38 and secured on the shaft 10 to rotate therewith, is another disk 40 carrying a series of pins 41 which project toward the stationary disk 38. Each of these pins is adapted to engage with a roll 42, Figs. 15 and 16, carried by a short lever 43 which is fulcrumed on part of the valve casing, and such engagement serves to lift the lever 43. The valve includes a plunger 44 sliding in the bore of the valve casing 37 and having a pin or rod 45 projecting from its lower end and resting on the valve 43, a spring 46 pressing the plunger downwardly. In its lowered position the valve plunger 44 does not quite close the port 47 leading into the pipe 36, this port being open to the atmosphere through a small hole 48, Fig. 16, in the valve cap. When, however, the lever 43 is lifted, it raises the plunger 44 sufficiently to establish communication between the ports 47 and 50, the latter port being connected through the pipe or tube 51 with a vacuum header 52, Fig. 1.

The timing of the movements of the suction head and of the valve are such that when the suction head 22 is brought down upon the top of the stack of blades shown in Fig. 13, the suction valve is opened, and the head 22 then rises, lifting the topmost blade in the stack off the pins 21—21. The suction head next is swung into line with the conveyor belt 21 where it is positioned to deposit the blade which it carries on the belt, registering the blade on a pair of the pins 7. At approximately this instant the suction valve plunger 44 closes the port 50 and opens the port 47 to the atmosphere, thus causing the suction head 22 to release the blade.

At this instant, also, a short puff of compressed air is delivered through a nozzle 53, Figs. 13 and 14, immediately above the blade which has just been transferred by the suction head, this puff serving to ensure the release of the blade by the suction head. It is usually found advantageous also to direct a similar puff of compressed air against the side of the stack of blades and close to the uppermost blade at the instant that the suction head picks up the latter blade so as to prevent the picking up of two blades at a time. Such a puff or jet of compressed air may be delivered through a nozzle 54, Fig. 14. Both compressed air nozzles 53 and 54 are connected to a compressed air supply line through a valve 55 arranged to be operated by a cam 57, Fig. 19, on the shaft 30.

When the suction head has been swung into position over the stack of blades and is allowed to drop by the lever 31, the whole suction head and the barrel pinion which carries it, drops under the influence of gravity until the suction head strikes the uppermost blade in the stack. This movement is permitted by the shape of the operating cam 29, Fig. 19, and it permits the movement of the suction head to accommodate itself to changes in height of the stack of blades. Because of these changes in height it is necessary also to adjust the nozzle 54 to position it at the desired level when a blade is picked off the stack, and this may conveniently be accomplished by supporting the nozzle 54 on an arm 60, Fig. 14, which is carried by a post 61 supported in a socket formed in a boss 62. A spring (not shown) acts on the post 61 to hold the arm 60 and nozzle 54 normally in a raised position. When, however, the suction head arm 23 is swung into position over the stack of blades, it then overlies the arm 60 so that upon its downward movement it depresses the arm 60, and consequently the nozzle 54, moving the latter down to a level depending upon the degree of its own lowering movement. Thus the nozzle always is positioned properly to deliver its jet of air at a point between the blade which the head is picking up and the next lower blade.

It will be observed that the suction head 22 should travel with the conveyor belt 2 during the short interval in which it deposits a blade on the belt. This is accomplished by mounting the entire pickup mechanism and its cams for movement in unison with the belt 2 during the brief interval required to position a blade on the belt. For this purpose most of the parts just described are supported on a plate 64, Fig. 13, the forward end of which is mounted to slide in a horizontal guideway 65 in one of the rail sections 14, which in this case forms a part of the machine frame. The rearward end of this plate is provided with two arms, one of which is indicated at 66, Figs. 1 and 13 and both of which embrace the shaft 30, these arms thus being supported on the shaft. Suitable collars are secured to the shaft to prevent the arms from moving longitudinally with relation to it, and the entire shaft is reciprocated at the proper point in the cycle of operations of the pickup mechanism to move the plate and the pickup mechanism in unison with the belt 2, this operation being performed by a cam 67, Fig. 3, fast on the end of the shaft 30. The groove of this cam is engaged by a roll 68 mounted to revolve on a fixed axis. A train of gears 70, Fig. 3, operatively connects the shaft 30 with the shaft 12, previously referred to, to drive the former shaft.

When the supply of blades in any stack on the plate 20, Fig. 14, becomes depleted, the plate may be rotated to bring another stack into operative relationship to the suction head, this rotating operation being performed by hand. Normally the plate 20 is locked in a stationary position by the dog 71, Fig. 14.

This mechanism thus operates to take blades from a supply and place them one at a time at each successive pair of pins on the belt 2 as the belt continues to move uninterruptedly.

*Sharpness testing apparatus*

The blades next pass into the first edge testing apparatus which is located at the station B, Figs. 1 and 3. Referring more particularly to Figs. 5 to 7, inclusive, it will be seen that this device or apparatus comprises a casing 72 through which the track 14 runs. The casing is nearly light tight and is provided at one side with a supplemental casing 73 for enclosing a lamp 74. The rays of this lamp are condensed or focused by lenses, one of which is shown at 75, to direct a strong beam of light through a slot 76, upon the edge of each blade 9 as the blades come successively into testing position. It will be observed that the beam of light so directed on the blade is confined chiefly to the edge portion of the blade and strikes the margin of the blade from above and at a considerable angle. Since the edge of a properly sharpened blade is substantially a line, it is evident that very little light will be reflected from, or scattered by, a sharp edge; but that any defects in the edge, such as nicks, dull spots or turned-over portions will reflect a very much larger percentage of the light. A light sensitive resistance element of some kind, such as a photo-electric cell, selenium cell, or the like, indicated at 77, is located in a compartment of the casing where it can "see" the edge of a blade 9 in testing position but is substantially protected from stray light, or in fact from light coming from any other source than the vicinity of the blade edge. This protection is afforded by partitions 78 and 80 in the casing 72, a narrow slot 81 being cut through the latter partition to permit the cell 77 to receive only rays coming from the direction of the blade edge.

As successive blades pass through the testing position the intensity of the light reflected from their edges on to the photo-electric cell 77, will vary with the degree of sharpness of successive edges. Consequently, the conductivity of the cell 77 will vary with such variations in sharpness. By connecting this cell in an electric circuit in which some suitable indicating device also is included, these variations in sharpness can be made to cause corresponding variations in current flow in the circuit which, in turn, may be made to give indications of degrees of sharpness which can either be read visually, registered in various ways, or may be utilized to operate or control suitable sorting mechanisms. A great variety of circuit arrangements may be used to accomplish this object, as will presently be described.

As the conveyor belt 2 continues to advance it carries the blades out of the casing 72 to the next station C, Fig. 3, where the blades rejected in the first sharpness testing operation are removed from the belt, and it carries the blades which pass this inspection to the second sharpness testing operation which is performed at the station D. The apparatus which makes this test is a duplicate of that above described at the station B, but the arrangement of the elements is reversed so that they operate on the edges of the blades opposite to those previously tested. No detailed description of this apparatus, therefore, is required. It may here be pointed out, however, that these two testing mechanisms could be combined in a single casing and both tests made either successively or substantially simultaneously, as desired.

The blades next are carried by the conveyor to the station E where another pickup mechanism is located under the control of the preceding sharpness testing mechanism to remove those blades from the conveyor which have been rejected in said test or inspection.

*Blade removing mechanisms controlled by sharpness testing units and control connections*

The two pickup mechanisms located at stations C and E are each substantially like that above described at the station A. They operate to pick up blades from the conveyor belt 2 and to stack them on magazine plates 82 and 83, respectively, Fig. 1, like the magazine plate 20, Fig. 14. Each of these pickup mechanisms is operated from the shaft 30 by cams like those previously described and they differ from the pickup mechanisms above described chiefly in that the timing of the application of suction to their respective suction heads is somewhat different, as will be obvious, and in the further fact that each has a single blower nozzle only arranged to direct a short puff of air against the blade carried by the suction head when the suction is cut off to cause the pickup mechanism to release the blade and deposit in on the stack. The valve for controlling this application of compressed air to the two nozzles of the pickup mechanisms at the stations C and E is shown at 84, Fig. 1, and is arranged to be operated by the cam 85 on the shaft 30. This valve also controls the application of compressed air to each of the other pickup mechanisms which will later be described, since all of these mechanisms operate in unison.

It will be understood that all of the pickup mechanisms go through their cycle of operations once during each rotation of the shaft 30. Whether either of the mechanisms at the stations C and E remove a blade from the conveyor belt 2, however, depends upon the application of suction to the suction head at the time when it is in its blade picking position. It will be clear that it is desirable to have the pickup mechanisms at the stations C and E remove only those blades which are rejected by the respective sharpness testing units B and D immediately preceding them. In other words, each of the pickups at the latter stations are under the control of the respective sharpness testing units. In the particular arrangement shown in the drawings this control is effected by controlling the operation of the suction valves for the respective pickup mechanisms at the stations C and E. These valves are indicated, respectively, at 86 and 87, Fig. 4. They are both mounted on a disk 88, Figs. 1 and 2, similar to the disk 38, which is supported on the shaft 10 but is held against rotation. Each of these valves is substantially like the valve 37 shown in Figs. 15 and 16 and several such valves are mounted on the supporting disk 88. They are arranged to be operated selectively by pins 90, Figs. 1, 2 and 20, carried by a disk 91 which is secured fast on the shaft 10. Each pin 90 is slidably mounted in the disk 91 for movement in a direction parallel to the axis of the disk, and it is provided at its left-hand end, Figs. 2 and 20, with a head 92 which projects beyond the face of the disk. A spring 93, Fig. 2, is associated with each pin and tends to project it toward the right. Normally, however, each pin is held in its retracted position, as shown in Fig. 2, by means of a spring actuated latch 94 pivoted on the face of the disk 91, one latch being provided for each pin.

As above stated, each of the sharpness indicating units includes a light sensitive element located in an electric circuit, as will shortly be described more in detail. This circuit controls the operation of an electro-magnet like that shown at 95, Fig. 20, one of these magnets being operatively associated with each of the valves carried by the disk 88. In this particular machine four such valves are used and four electro-magnets therefore are employed. All of these magnets are adjustably mounted on a stationary disk 96 which is supported on the shaft 10 but is held against rotation.

Normally the coil of each of these magnets is energized so that the core 97, Fig. 20, of the magnet is held in a retracted position. When either of the sharpness testing devices indicates that a blade should be rejected, the magnet 95 for that particular testing device is momentarily deenergized, and the core 97 for the magnet is thereupon projected by springs 98—98, Fig. 20, associated with it. The projected core or plunger strikes one of the latches 94, thus releasing the pin 90 previously held by it and allows the spring 92 for this pin to move the pin toward the right, Fig. 2, far enough to operate the lever for the next suction valve ahead of it.

It will be observed that an appreciable interval of time occurs between the testing of the edge of any blade and the arrival of that blade in position to be picked off the conveyor by the next pickup mechanism. Consequently, the action of the pickup mechanism associated with each of the edge testing units must be delayed long enough to enable the blades, respectively, to arrive in cooperative relationship to the pickups. This delayed action is obtained by so spacing the solenoids or electro-magnets 95 with reference to the suction valves for the respective pickups that the conveyor belt 2 can travel the desired distance before the suction valves are operated by the pins 90. In other words, the defective blade indication is given simultaneously with the testing of the blade, and at substantially the same instant the plunger 97 is projected and operates a latch 94 to release a pin 90. This pin, however, travels with the disk 91 for a predetermined distance before it operates the suction valve associated with the particular solenoid 95 which has just been deenergized. The interval of time by which the action of the suction valve is delayed can readily be predetermined by adjusting each solenoid circumferentially on the disk 96 into the desired relationship to its respective suction valve. After any pin has operated a valve it comes in contact with a roll 100, Fig. 2 secured in a fixed position on the rim of the disk 88, and as it passes the roll it is pushed back by the roll far enough to allow its latch 94 to engage and lock it in its retracted position. This occurs before the pin has travelled far enough to operate another suction valve.

*Circuit arrangement of control connections*

Figure 17:
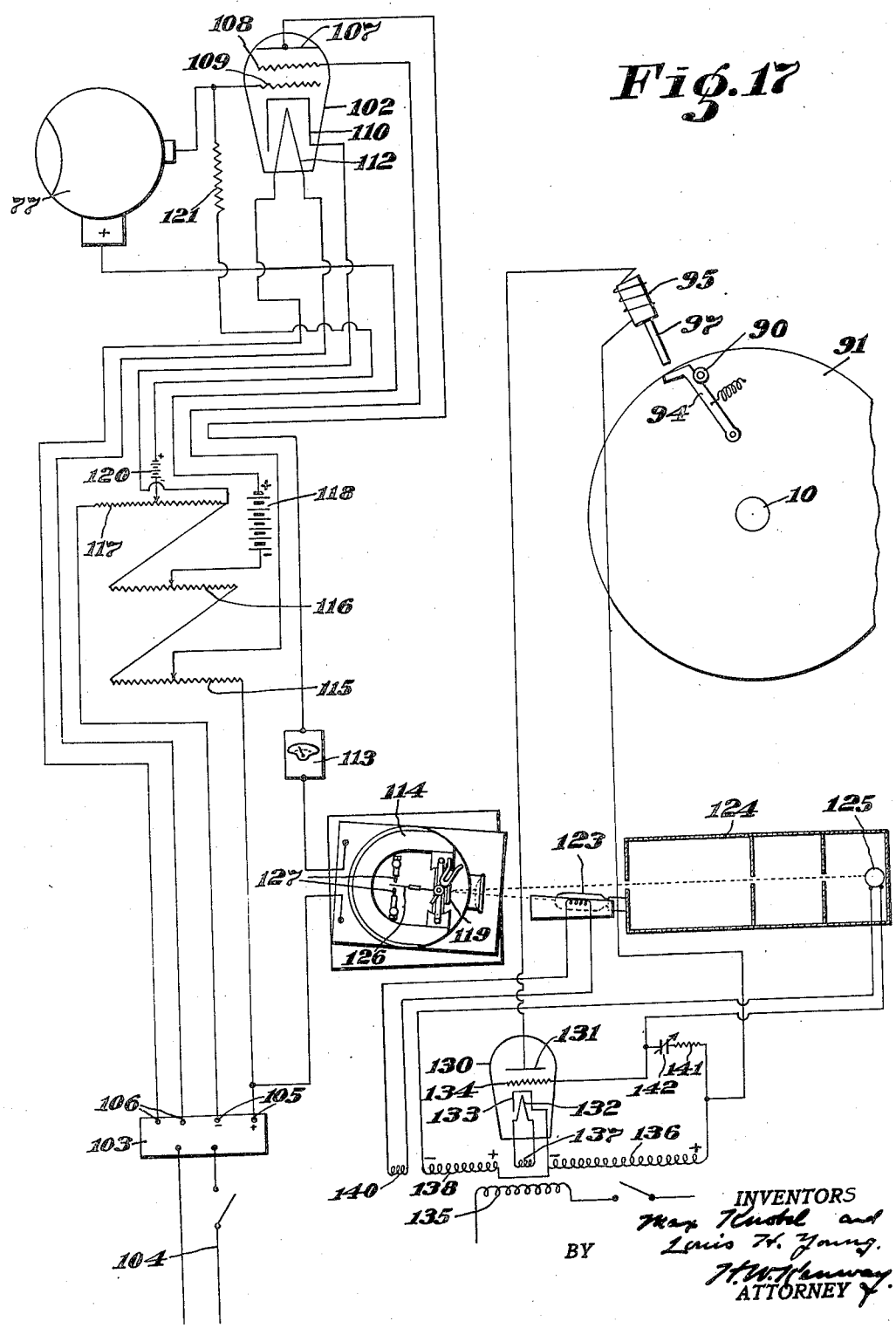

A suitable circuit arrangement for use in the control connections between the sharpness testing devices and the solenoids 95 is shown diagrammatically in Fig. 17. In addition to the photoelectric cell 77 previously referred to, these connections also include a tube 102, similar to those used in radio work. The particular tube shown is of the screen grid type and the tube known commercially as UX 224 may be used for this purpose. Power for operating the apparatus may conveniently be supplied through a B battery eliminator 103, the supply conductors for this device being shown at 104. For purposes of explanation it may be assumed that two hundred volts direct current are delivered across the terminals 105 and a much smaller voltage, say three volts, across the terminals 106.

The tube 102 includes a positive electrode or anode consisting of a plate 107, a screen grid 108, a control grid 109, a cathode 110, and a filament 112. The plate 107 is connected to the positive terminal 105, preferably through a milliammeter 113 and a relay instrument 114. Three potentiometers 115, 116 and 117 are connected in series directly across the terminals 105, and the adjustable contacts of these devices are connected by suitable conductors to other elements of the circuit. These potentiometers should be of high value, those indicated at 115 and 116 each being, say, ten thousand ohms, while that indicated at 117 may be twenty-five hundred ohms. As shown, the adjustable contact of the potentiometer 115 is connected directly to the screen grid 108, while that of the potentiometer 116 is connected through a battery 118 to the positive terminal of the photoelectric cell 77, and that of the potentiometer 117 is connected through a C battery 120 and a high non-inductive resistance 121 to the control grid 109, this grid also being connected directly to the negative terminal of the photoelectric cell. The battery 118 should have a relatively high value, say for example, sixty-five or seventy volts, while the C battery 120 may be about four or five volts. The resistance 121 should have a value of four or five megohms. The filament 112 is connected directly to the terminals 106 of the B battery eliminator.

When the testing machine is in operation, the various elements of the system are so adjusted that a small plate current flows continuously through the meter 113 and instrument 114. Assuming that no blade is in testing position this current may take a value of approximately one milliampere. When a blade is brought into testing position and the beam of light from the lamp 74, Fig. 5, is directed against its edge, the light reflected from the edge, if the blade is sharp, will not be sufficient to increase appreciably the plate current flowing through the circuit just mentioned. The plate current will vary, however, with variations in the intensity of the light reflected from the edges of successive blades being tested, and if a blade is dull a very substantial increase in plate current will thereby be produced. This increase in current occurs due to the increase in conductivity of the photoelectric cell 77 and a consequent change in the voltage of the control grid 109, as will be readily understood by those skilled in this art.

The instrument 114 is essentially a milliammeter with a small mirror 119 mounted on its armature. A beam of light from the lamp 123 is directed constantly against this mirror and may be reflected from the mirror through a series of apertures in the box 124 against a selenium cell 125. An arm 126 rigid with the armature of the instrument 114 is arranged to swing between adjusting screws 127, and in the preferred arrangement these screws are so set that so long as the current flowing through the plate circuit remains below a predetermined value, say for example one milliampere, the arm 126 will be held against one of the screws 127, and the beam of light reflected from the mirror will not illuminate the selenium cell 125.

The circuit arrangement in which the selenium cell 125 is included cooperates with the instrument 114 to act as a relay for amplifying very substantially the current variations in the plate circuit of the tube 102, and this relay organization forms the subject matter of a pending application filed by us. For present purposes a brief description only of this circuit arrangement is necessary. It comprises a grid controlled vacuum or gas filled tube indicated at 130. Preferably, but not necessarily, a screen grid tube filled with mercury vapor is used. This tube has a positive electrode or anode consisting of a plate 131, a filament 132, a cathode 133, and a grid 134, all these parts being enclosed in an evacuated glass envelope equipped with suitable terminals. A tube known commercially as the Thyratron gives good results. The power supply consists of a transformer including a primary coil 135 and a secondary divided into sections, one of which is indicated at 136, and is designed to supply a potential of, say, one hundred ten volts, while another, indicated at 137, is intended to supply, say, five volts for heating the filament 132. Still another section 138 may give a voltage of approximately twenty volts, while the fourth section 140 is utilized to heat the filament of the lamp 123 previously referred to.

A high non-inductive resistance 141, and if desired also a condenser 142, are connected in series with the selenium cell 125, and together are connected across the secondary coils 136 and 138. The grid 134 is connected to a point between the cell 125 and the condenser 142.

With this arrangement, therefore, the potential of the grid will be controlled by the resistance of the selenium cell 125, and this control is such that current will flow through the tube 130 so long as the cell 125 is not illuminated, but such flow of current will be interrupted by the illumination of the cell. It will be observed that the coil 95 of one of the electro-magnets, previously referred to, is in series with the plate 131 of the tube 130 so that this coil normally is energized and becomes deenergized only when the sharpness testing unit with which it is connected indicates a dull blade. As just explained, such an indication involves an increase in the flow of current through the instruments 113 and 114 sufficient to cause the mirror 119 in the latter instrument to shift the beam of light on to the cell 125, thus causing the tube 130 to "go out", or, in other words, to stop conducting. Preferably the adjustment of the screws 127 in the instrument 114 is such that while, as above stated, the beam of light reflected by the mirror does not strike the selenium cell until the current flowing through the plate circuit of the tube 102 rises to a substantially predetermined value, currents above that value operate simply to maintain the beam of light on the cell 125. The cell is so enclosed in the box 124 that it is amply protected from stray light.

Each of the sharpness testing units is connected with its respective electro-magnet coil 95 by an electrical apparatus like that shown in Fig. 17. While a part of this apparatus operates as a relay, it should be noted that such operation does not depend upon movable contacts which must be opened or closed. The arrangement is, therefore, extremely reliable and a very high degree of amplification is obtainable. For example, we have found that current fluctuations in the test circuit of in the neighborhood of one-one hundredth of a milliampere may be made to cause a current of one or two amperes to flow through the plate circuit of the tube 130 and consequently through the solenoid 95. Even higher amperages in the latter circuit can be similarly controlled. It will be understood that in speaking of the "test circuit" we mean the circuit in which the milliammeter 113 and instrument 114 are connected.

Width testing apparatus

The width testing unit is located at the station F, Figs. 1 and 4, the elements which perform this testing operation being enclosed in a casing 144. These elements are best shown in Figs. 9, 10 and 12. As the blades 9 are carried along by the belt 2 into the casing 144 they are brought successively under a plate 145 in which are formed two narrow parallel slots 146. The center lines of these slots are spaced apart by a distance equal to the spacing of the edges of a blade of the correct width. These slots lie directly under a fairly large incandescent lamp 147 which directs strong beams of light downwardly through the slots 146 and against the edges of a blade 9 located in position to have its width tested. More or less of these beams of light are intercepted or cut off by the edges of the blades depending, of course, upon variations in the width of the blades. Those fractions of the beams which pass the blade edges travel downwardly through slots 148—148 in the underlying and supporting plate 150 and strike, respectively, inclined mirrors or reflecting surfaces 151—151 which reflect the light so received upon a photoelectric cell or other light sensitive resistance element 152.

Since the intensity of the light which will be received by the photocell 152 will depend upon variations in the widths of successive blades brought into testing position, and since the conductivity of the photocell will depend upon the degree of illumination which it receives, this cell can be used in an electric circuit to control the operation of indicating and sorting apparatus in essentially the same manner that the photocell 77 is used in connection with the sharpness testing units.

A circuit arrangement suitable for this purpose is illustrated in Fig. 18. The testing circuit there shown is like that illustrated in Fig. 17 except that the tube 153 which takes the place of the tube 102 in Fig. 17 is of a slightly different type in which it uses the filament 154 as the cathode. It includes a plate anode 155, a shield grid 156 and a control grid 157 which perform essentially the same functions as the corresponding elements in the tube 102. A tube known commercially as UX 222 may be used with satisfactory results at 153. Power may conveniently be supplied to the apparatus by a B battery eliminator 158 and the circuit connections as shown in Fig. 18 are identical with those shown in Fig. 17 except that the cathode connection from the potentiometer 117' is made to the middle point of an impedance coil 160 which is connected across the terminals of the filament 154, this arrangement being common in using tubes of the type illustrated. The plate circuit or testing circuit also includes a milliammeter 161 having a range of, say, 1.5 milliamperes like the milliammeter 113 of the circuit prevously described, and an instrument 162 like that shown at 114 in Fig. 17.

The relay circuit shown in Fig. 18 is substantially like that shown in Fig. 17 except that it involves a duplex arrangement. This is made necessary by the fact that it is desirable to reject those blades which are too narrow as well as those blades which are too wide. This circuit arrangement therefore includes two tubes 163 and 164 which may be like the tube 130, Fig. 17, and which are connected in parallel. Two selenium cells 165 and 166 are connected with the respective tubes 163 and 164 in the same manner that the cell 125 is connected with the tube 130. Each cell is utilized to control the grid voltage of its respective tube and serves, therefore, to cut the tube out of operation or to make it stop conducting when the cell is illuminated. Both selenium cells are located in a housing or casing 167 which protects them from stray light, this casing having suitably alined apertures to admit the beam of light reflected from the mirror 168 of the instrument 162. A small lamp 170 throws a beam of light upon the mirror 168. Two solenoids or electro-magnet coils 95 are connected in the plate circuits of the two tubes 163 and 164, each of these solenoids controlling a plunger or core which is adapted to operate a latch 94, as in the construction shown in Fig. 17.

With this arrangement when a razor blade is brought into testing position under the lamp 147 the photocell 152, Fig. 12, will "see" both edges of the blade simultaneously. If the intensity of the light which it receives is below a predetermined amount, the mirror 168 will be swung into position to illuminate one of the selenium cells 165 or 166, thus indicating that the blade should be rejected. This rejection is effected by the deenergization of the solenoid 95 which is under the control of the cell so illuminated and the tube associated with it. If the blade in testing position is too narrow, a much greater quantity of light will be directed upon the photocell 152, thus causing the mirror 168 to swing in the opposite direction far enough to illuminate the other selenium cell and thereby to effect the deenergization of the solenoid 95 connected with it. If, however, the blade in testing position is of substantially the correct width, then the beam of light reflected from the mirror 168 will occupy an intermediate position and will not illuminate either of the selenium cells 165 or 166.

The pickup mechanisms controlled by the width testing unit are shown at the stations G and H, Figs. 1 and 4; and the suction valves for them are shown at 171 and 172, respectively, Fig. 4. As above indicated, one of these pickups removes only blades which are too wide and the other only blades which are too narrow.

Those blades which successfully pass all the tests are removed by the pickup mechanism located at the station I. The suction valve for this pickup is indicated in Fig. 4 at 173, this valve being mounted on the disk 38 and being operated by pins 41 on the disk 40.

It may here be pointed out that while the width measuring unit illustrated in Fig. 2 measures the extreme width of the blades, the dimension to be measured will vary with blades of different constructions. For example, in a single edge blade the overall width may either be important or not, depending upon the manner in which the blade is positioned in the holder. If it is located by positioning pins, then the width to be measured obviously will be the distance between the pins and the blade edge. The unit shown in Fig. 12 may also be said to measure this width since each blade is positioned by the pins 7 on the belt 2, and variations in the distance between the pins and either edge of the blade will produce corresponding variations in the width of the beam of light intercepted by that edge. Due, however, to the fact that these blades are double edged, this particular unit has been arranged to use the sum of the light rays passing both edges. This would not be the case if independent photocells were used for both edges.

This apparatus has the advantage of being extremely accurate, very reliable, and of avoiding any necessity for handling the blades manually or touching either edge. Any liability of injuring the edges in performing the width testing operation therefore is effectually avoided.

As the end of a blade moves into or out of testing position a considerably greater quantity of light is allowed to strike the photoelectric cell 152 due to the fact that a much smaller proportion of the slots 146 are covered by the blade than is the case when a blade is in testing position. During these times, therefore, the current in the testing circuit is abnormally high and consequently the mirror 168 tends to swing into a position where it indicates too narrow a blade. In order to prevent the actuation of the mechanism during these periods, a switch consisting of two spring contacts 190 and 191, Figs. 11 and 18, is connected into one side of the power circuit leading to the selenium cells 165 and 166, and this switch is arranged to be operated automatically by a cam 193 fast on the shaft 30. A lever 192, Figs. 1 and 11, has a bent end resting on the cam 193, the lever being held against the periphery of the cam by a spring 194. This lever carries an insulating arm 195 which is arranged to engage at times with the upper contact 190 and force it downwardly into engagement with the lower contact 191, thus closing the circuit through the selenium cells 165 and 166. This action occurs only when the end of the lever 192 drops into a notch 196 in the cam 193 and the timing of the cam is made such that the circuit is closed only when a blade is in proper testing position, the switch remaining open at all other times. So long as this switch is open the tubes 163 and 164 continue to conduct current or remain "on", regardless of whether or not the selenium cells are illuminated, and current therefore keeps flowing through the two solenoids 95 in series, respectively, with said tubes. Consequently, the electrical circuit of the sorting mechanism controlled by the width testing unit is held in an inactive condition, so far as the sorting function is concerned, at all times except during those periods in which blades are properly positioned for the width testing operation. This may result in very short lengths of the sharpened edges of the blade at each end not being tested for width, but these untested parts are so short that they can be safely disregarded.

*Shutter for sharpness testing unit*

The sharpness testing units above described are designed to illuminate a small section only of a blade edge at a time, the blade passing through the beam of light directed on it during the testing operation. It is desirable to prevent the beam of light from striking those portions of the blade at opposite ends of the sharpened edge since these parts of the blade are not intended to be sharpened and if illuminated would operate through the photocell and the connections controlled thereby to reject the blade even though its edge were up to the edge required standard. It is contemplated that the entire sharpened edge of a blade could be illuminated simultaneously, but even with an apparatus so organized it would still be desirable to prevent illumination of the unsharpened end portions of the blade.

This may be accomplished in various ways. In the construction shown in Figs. 5, 6 and 7 a shutter 175 is arranged to slide up and down across the aperture 76 through which the beam of light is admitted to the edge of the blade, and mechanism timed with the movement of the conveyor 2 is provided to open and close the shutter at the desired points in the conveying movement of each blade. As shown, the lifting movement of the shutter 175 is produced by a cam 176, Fig. 5, on the shaft 30 of the machine, this cam operating through a lever 177 to raise a rod 178 which slides vertically in guides secured to the casing 72, the upper end portion of the rod being bent to provide a horizontal arm 179 overlying the casing 172. A small upright rod 180 is pivotally connected to the shutter 175 and extends upwardly through the casing top and through an eye in the horizontal arm 179. This rod is encircled by a spring 181 which bears against the arm 179 and is backed up by a nut 182 threaded on the upper end of the rod. The shaft 30 makes one complete revolution in each cycle of operations of the machine and therefore during the testing of each blade edge, and the cam 176 is timed to lift the shutter 175 and to drop it again at the correct instants to accomplish the result above described.

In order to prevent this mechanism from opening the shutter when no blade is in testing position, the shutter 175 is equipped with a stop or lug 183 arranged to be engaged by a latch 184 which is pivoted on the shutter guide. This latch has the form of a bell crank lever, as shown in Fig. 7, and its upper arm is arranged to be engaged by an arm 185 secured fast on one end of a short shaft 186. A feeler 187 is secured fast to the opposite end of this shaft where it will be engaged and lifted by the margin of each blade as the blade is moved into testing position. If, therefore, a blade fails to come into testing position the latch 184 will hold the shutter 175 closed notwithstanding the action of the cam 176, the movement of the rod 178 produced by this cam resulting simply in compressing the spring 181. Normally, however, as each blade moves into testing position, it operates through the feeler 187, shaft 186 and arm 185 to swing the latch 184 in a counter-clockwise direction, Fig. 7, where it releases the stop 183 and permits the cam 176 to open the shutter.

Operation

The machine is entirely automatic in its operation, the attendant being required simply to keep a proper supply of blades in the magazine of the first pickup mechanism at the station A and to remove the rejected blades and those blades which pass the test successfully. The blades are placed on the conveyor belt at the first station and are carried by it through the different testing devices, the pickups removing the blades at various points along their path of travel in accordance with the results of the testing operations, and the accepted blades finally being taken off at the station I. The manner in which the various units operate has been explained so fully in connection with the foregoing description that no further statement as to their operation is believed to be necessary. In both the sharpness testing units and also in the width testing device, variations in sharpness of successive edges and in the width of successive blades are respectively caused to create corresponding variations in current flow in an electric circuit, and the current fluctuations so produced are utilized to separate the blades which are satisfactory from those which are not.

In view of the fact that certain of the tests may be affected by the presence of dust particles carried by the edges of the blades, the machine shown has been equipped with a mechanism 197, Fig. 3, for wiping or cleaning the edges of the blades before they go into the first testing unit. This mechanism consists simply of belts for wiping the bevelled surfaces of the blades in a manner similar to that used in certain stropping machines.

We have found in practice that the machine can handle the blades rapidly, and that the testing operations are performed with an unusually high degree of accuracy. The results are far more uniform than those produced by the manual testing methods heretofore generally employed. At the same time the expense of performing the testing operations is reduced very substantially.

While we have herein shown and described a preferred embodiment of our invention, it will be evident that the invention may be embodied in other forms without departing from the spirit or scope thereof. Also, that the invention is not limited to the conjoint use of its various features herein disclosed. For example, it is contemplated that the width testing and sharpness testing mechanisms may be used independently of each other, the blades being tested for width after the grinding operation has been performed and those blades which successfully pass this test then being carried through the remaining manufacturing operations before their edges are tested for sharpness. In this way many of the manufacturing operations on those blades which are too wide or too narrow will be eliminated.

It will also be understood that while certain specific voltages, resistances, and the like have been referred to above, that such references have been made simply by way of illustration and for purposes of explanation, and that factors of this character as well as the nature and arrangement of the parts necessarily will be determined by the requirements of individual cases. It is further noted that the term "power-driven" is used herein in a broad sense and particularly to distinguish from the hand operation of devices by an operator.

Having thus described our invention, what we desire to claim as new is:

1. That improvement in methods of detecting variations in the sharpness of blade edges which consists in directing a beam of light successively against the edges of a series of blades, and measuring variations in the intensity of the light reflected from successive edges.

2. That improvement in methods of detecting variations in the sharpness of blade edges which consists in directing a beam of light successively against the edges of a series of blades, and utilizing variations of predetermined degree in the intensity of the light reflected from successive edges to indicate relative degrees of sharpness.

3. That improvement in methods of detecting variations in the sharpness of blade edges which consists in illuminating successively the edges of a series of blades, whereby the light reflected by successive edges will vary with variations in the sharpness of successive edges, and causing said variations in reflected light to produce effects depending upon the degree of the latter variations.

4. That improvement in methods of detecting variations in the sharpness of different parts of a blade edge which consists in passing the edge of a blade through a beam of light, and causing variations in the light reflected by successive portions of the edge to produce effects depending upon the degree of the latter variations.

5. That improvement in methods of testing the sharpness of a blade edge which consists in directing a beam of light against said edge, causing the light reflected from said edge to control the flow of current through an electric circuit, and utilizing said current flow to give an indication of the relative sharpness of said edge.

6. That improvement in methods of detecting variations in the sharpness of blade edges which consists in passing the edges of a series of blades successively through a beam of light, and measuring variations in the intensity of the light reflected from successive edges.

7. That improvement in methods of detecting variations in the sharpness of blade edges which consists in directing a beam of light against the edges of a continuously moving series of blades, and utilizing variations in the light reflected from said edges to give relative indications of the sharpness of successive edges.

8. That improvement in methods of detecting variations in the sharpness of blade edges which consists in directing a beam of light successively against the edges of a series of blades, and utilizing variations in the light reflected from said edges to move an indicating element in response 9. That improvement in methods of detecting variations in the sharpness of blade edges which consists in directing a beam of light successively against the edges of a series of blades, and causing variations in the light reflected from successive edges to produce changes in an electric circuit depending upon variations in the sharpness of said edges.

10. That improvement in methods of detecting variations in the sharpness of blade edges which consists in directing a beam of light successively against the edges of a series of blades, causing variations in the light reflected from successive edges to produce changes in an electric circuit depending upon variations in the sharpness of said edges, and utilizing said circuit changes to give indications of the condition of said edges.

11. That improvement in methods of sorting blades according to the sharpness of their edges, which consists in directing a beam of light successively against the edges of a series of blades, sorting said blades, and controlling said sorting operation in accordance with predetermined variations in the light reflected from successive edges.

12. That improvement in methods of sorting blades according to the sharpness of their edges, which consists in directing a beam of light successively against the edges of a series of blades, causing variations in the light reflected from successive edges to produce changes in an electric circuit depending upon variations in the sharpness of said edges, and utilizing said circuit changes to sort the blades.

13. In a machine of the character described, the combination of means for moving the edge of a blade through a beam of light, and means for measuring changes in the intensity of the light reflected from successive portions of said edge.

14. In a machine of the character described, the combination of means for positioning a blade, means for directing a beam of light on the edge of a blade so positioned, and means for utilizing the light reflected from said edge to indicate the degree of sharpness of the edge.

15. In a machine of the character described, the combination of means for directing a beam of light successively against the edges of a series of blades, and means for producing changes in an electric circuit depending upon variations in the light reflected by successive edges.

16. In a machine of the character described, the combination of means for directing a beam of light successively against the edges of a series of blades, whereby the light reflected by said edges will vary with the sharpness of the edges, means for producing changes in an electric circuit depending upon variations in the light reflected by successive edges, and means for causing said circuit changes to indicate variations in the sharpness of said edges.

17. In a machine of the character described, the combination of means for directing a beam of light successively against the edges of a series of blades, whereby the light reflected by said edges will vary with the sharpness of the edges, means for producing changes in current flow in an electric circuit depending upon variations in the light reflected by successive edges, and mechanism for utilizing predetermined changes in said current flow to sort said blades to separate the sharp blades from the dull blades.

18. In a machine of the character described, the combination of means for positioning a blade, means for directing a beam of light on the edge of a blade so positioned, and an electric circuit including a light sensitive resistance element arranged to receive light reflected from said edge, whereby the resistance of said element will be modified by variations in the quantity of reflected light coming to it from the direction of said edge.

19. In a machine of the character described, the combination of means for positioning a blade, means for directing a beam of light on the edge of a blade so positioned, an electric circuit including a light sensitive resistance element located in the path of light reflected by said edge, and means for protecting said element from stray light.

20. In a machine of the character described, the combination of means for positioning a blade, means for directing a beam of light on the edge of a blade so positioned, an electric circuit including a light sensitive resistance element arranged to receive light reflected from said edge, whereby the resistance of said element will be modified by variations in the quantity of reflected light coming to it from the direction of said edge, means for protecting said element from stray light, and indicating means arranged to be operated by changes of predetermined degree in the current flowing through said circuit.

21. In a machine for testing razor blades, the combination of means for positioning a blade for the testing operation, means for directing a beam of light on the edge of a blade so positioned, a light sensitive resistance element located in the path of the rays of light coming from the direction of said edge, an electric circuit in which said element is connected, means for protecting said element from stray light, and means for automatically cutting off the light from said element when a blade is not in proper position for testing.

22. In a machine for testing razor blades, the combination of means for positioning a blade for the testing operation, means for directing a beam of light on the edge of a blade so positioned, a light sensitive resistance element located in the path of the rays of light coming from the direction of said edge, an electric circuit in which said element is connected, means for protecting said element from stray light, and means for automatically cutting off the light from said element between the testing of successive blades and while the end portions of the blades move through the testing position.

23. In a machine for testing the sharpness of blade edges, the combination of means for positioning a blade for the testing operation, means for directing a beam of light on the edge of a blade so positioned, a photo-electric cell located in the path of the light reflected from the edge of said blade, and means of protecting the cell from light reflected from parts of the blade at the ends of its edge.

24. In a machine for testing the sharpness of blade edges, the combination of means for positioning a blade for the testing operation, means for directing a beam of light on the edge of a blade so positioned, a photo-electric cell located in the path of the light reflected from the edge of said blade, a casing for protecting said cell from stray light, a shutter for controlling the admission of light to said cell, and means for automatically opening said shutter when a blade is placed in testing position and closing it as the blade moves out of said position.

25. In a machine for testing the sharpness of blade edges, the combination of means for positioning a blade for the testing operation, means for directing a beam of light on the edge of a blade so positioned, a photo-electric cell located in the path of the light reflected from the edge of said blade, a casing for protecting said cell from stray light, a shutter for controlling the admission of light to said cell, and mechanism under the control of the blade for operating said shutter.

26. In a machine for testing razor blades, the combination of a continuously moving conveyor for carrying a series of blades to be tested and positioning them successively for the testing operation, means for directing a beam of light on the edge of a blade so positioned, a photo-electric cell located in the path of rays of light coming from the direction of said edge, an electric circuit in which said element is connected, and means operating in timed relationship to the movement of the blades on said conveyor to cut off the light from said cell between the testing of successive blades and while the end portions of the blades move through the testing position.

27. In a machine for testing razor blades, the combination of a continuously moving conveyor for carrying a series of blades to be tested and positioning them successively for the testing operation, means for directing a beam of light on the edge of a blade so positioned, a photo-electric cell located in the path of rays of light coming from the direction of said edge, an electric circuit in which said element is connected, a shutter for controlling the admission of light to said cell, and power driven mechanism operating in timed relationship to the movement of said blades through the testing position to cut off the light from said cell between the testing of successive blades and while the end portions of the blades move through the testing position.

28. In a machine for testing the sharpness of razor blades, the combination of a continuously moving conveyor for carrying a series of blades to be tested and positioning them successively for the testing operation, means for directing a beam of light against the edge of each blade so positioned, a photo-electric cell located in the path of light reflected from the edge of each blade in testing position, a shutter for controlling the admission of light to said cell, mechanism for operating said shutter, and means for controlling the action of said mechanism on the shutter in accordance with changes in the position of each blade to protect said cell from light reflected from parts of the blade at the ends of its edge.

29. In a machine of the character described, the combination of means for positioning razor blades successively for the testing of their edges, means for directing a beam of light on the edge of said blade so positioned, a photo-electric cell located in the path of light reflected from each of said edges, an electric circuit in which said cell is included, whereby variations in the sharpness of the edges of successive blades will act through said cell to produce variations in the current flowing through said circuit, sorting means for separating the sharp blades from the dull blades, and connections whereby said circuit is caused to control the operation of said sorting means.

30. In a machine of the character described, the combination of a conveyor, mechanism for automatically placing razor blades one at a time on said conveyor, a plurality of devices for testing said blades, one of said devices serving to test the sharpness of the edge of each blade, a plurality of mechanisms for removing the blades from said conveyor, and connections between said testing devices and said removing mechanisms for causing said blade removing mechanisms to separate the blades which successfully pass the tests from those which fail to pass such tests.

31. In a machine of the character described, the combination of a conveyor, mechanism for automatically placing razor blades one at a time on said conveyor, a plurality of devices for testing said blades, one of said devices serving to test the sharpness of an edge of each blade, a plurality of suction pickup mechanisms for removing the tested blades from the conveyor, valves controlling the application of suction to said pickup mechanisms, and connections for causing said testing devices to control the operation of said valves to effect a separation of the blades which pass the tests from those which fail to pass.

32. In a machine of the character described, the combination of a conveyor, mechanism for automatically placing razor blades one at a time on said conveyor, a plurality of devices for testing said blades, one of said devices serving to test the sharpness of an edge of each blade, a plurality of suction pickup mechanisms for removing the tested blades from the conveyor, a valve for each of said suction pickup mechanisms, each valve controlling the application of suction to its respective pickup mechanism, and connections for causing each of said testing devices to control the operation of one of said valves in accordance with the results of the tests performed on each blade.

33. In a machine of the character described, the combination of a conveyor, mechanism for automatically placing razor blades one at a time on said conveyor, a plurality of testing stations each including a device for performing a testing operation on said blades as they are presented successively to each station by said conveyor, a plurality of pickup mechanisms corresponding in number to said testing devices and each spaced along said conveyor by several blade positions from its respective testing station, said pickup mechanisms serving to remove the blades one at a time from said conveyor, and means for selectively controlling said pickup mechanisms from their respective testing devices to cause each device to indicate the rejection of a blade which fails to pass the test but to delay the action of its respective pickup mechanism until the blade so rejected has arrived in operative relationship to that particular pickup mechanisms.

34. In a machine for testing double-edged blades, the combination of means for successively positioning blades for the testing operation, means for directing a beam of light on one side of said blade adjacent to and including its edges, a plate provided with spaced parallel slots with which the edges of said blade are registered when in testing position, whereby blades of different widths will intercept varying amounts of light, and means responsive automatically to variations in the amount of light intercepted by successive edges for indicating variations in the widths of the blades.

35. In a machine for testing blades, the combination of means for positioning a blade for the testing operation, a source of light for directing a beam of light on the edge portion of a blade so positioned, an electric circuit including a light sensitive resistance element arranged to receive light reflected from said edge, whereby the resistance of said element will be modified by variations in the quantity of light coming to it from the direction of said edge, a part having an aperture for limiting the amount of light from said source which will strike said element, means for protecting said element from stray light, and indicating means arranged to be operated by changes in the current flowing through said circuit.

36. In a machine for testing the widths of double edged razor blades, the combination of a plate having parallel spaced slots with which the edges of said blades are registered when in testing position, means for locating the blades successively in said position, a photocell arranged to receive the rays of light directed past said edges and through said slots whereby the resistance of said cell will vary with variations in the amount of light intercepted by successive blades, and an electric circuit in which said cell is operatively connected.

37. In a machine of the character described the combination of a conveyor, mechanism for automatically placing razor blades one at a time on said conveyor, means for performing a testing operation on the blades while they are on said conveyor, said testing means including apparatus for directing a beam of light on the edges of the blades undergoing test and apparatus so located as to receive light coming from the edges of successive blades, and responsive to variations in the intensity of light coming therefrom, means for removing the tested blades from said conveyor and sorting them, and connections for causing said testing means to control the operation of said sorting means.

38. A machine for testing double-edged blades, having, in combination, a movable blade conveyor, separate sources of light for directing beams upon the opposite edges of a blade in the conveyor, and means for measuring the intensity of the light reflected from said edges.

39. A machine for sorting double-edged blades, having, in combination, a movable blade conveyor, separate sources of light for directing beams upon the opposite edges of a blade in the conveyor, means for measuring the intensity of light reflected from each edge, and means for discarding those blades from either edge of which the reflected light exceeds a predetermined amount.

40. A machine for sorting double-edged blades, having, in combination, an intermittently acting conveyor for blades, means for directing separate beams of light upon blades positioned at successive stations in said conveyor, and means responsive to the intensity of light coming from the blade edges at the respective stations for discarding blades falling below a predetermined standard.

41. In a machine of the character described, the combination of means for testing the sharpness of blade edges and making automatically a responsive indication, automatic mechanism for feeding the blades one at a time to said testing and indicating means, and power driven mechanism for automatically sorting the tested blades controlled in accordance with their sharpness as measured by the indication of the testing operation.

42. In a machine of the character described, the combination of a conveyor, mechanism for automatically placing razor blades one at a time on said conveyor, a blade edge testing apparatus operating automatically to make an indication responsive to the sharpness of the tested edges and to which the blades are delivered by said conveyor, and power driven mechanism for sorting the blades automatically controlled in accordance with the condition of their edges as measured by the indication of the testing operation.

43. In a machine of the character described, the combination of a conveyor, mechanism for automatically placing razor blades one at a time on said conveyor with their edges in exposed position, means for performing a testing operation on the blades while their edges are thus located by said conveyor and for automatically indicating an appropriate response, and power driven mechanism for subsequently sorting the blades automatically controlled in accordance with the location of their edges as indicated by said testing operation.

MAX KNOBEL.
LOUIS H. YOUNG.